(12) United States Patent
Trimberger et al.

(10) Patent No.: US 8,386,990 B1
(45) Date of Patent: Feb. 26, 2013

(54) UNIQUE IDENTIFIER DERIVED FROM AN INTRINSIC CHARACTERISTIC OF AN INTEGRATED CIRCUIT

(75) Inventors: Stephen M. Trimberger, San Jose, CA (US); Austin H. Lesea, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 119 days.

(21) Appl. No.: 12/961,753

(22) Filed: Dec. 7, 2010

(51) Int. Cl.
G06F 17/50 (2006.01)
G06F 19/00 (2006.01)
H01L 23/58 (2006.01)
H01L 25/00 (2006.01)
H03K 19/00 (2006.01)

(52) U.S. Cl. .......... 716/136; 716/55; 716/110; 700/116; 703/14; 257/798; 326/16; 326/36; 326/38; 326/41; 326/47; 326/101; 713/176; 713/180

(58) Field of Classification Search .......... 716/55, 716/110, 136; 700/116; 703/14; 257/798; 326/16, 36, 38, 41, 47, 101; 713/176, 180
See application file for complete search history.

(56) References Cited

U.S. PATENT DOCUMENTS

| | | | |
|---|---|---|---|
| 4,203,070 A | 5/1980 | Bowles et al. | |
| 4,754,216 A | 6/1988 | Wong | |
| 4,810,975 A | 3/1989 | Dias | |
| 4,897,652 A | 1/1990 | Leon | |
| 5,007,087 A | 4/1991 | Bernstein et al. | |
| 5,276,734 A | 1/1994 | Hashimoto | |
| 5,450,360 A | 9/1995 | Sato | |
| 5,523,746 A | 6/1996 | Gallagher | |
| 5,787,012 A * | 7/1998 | Levitt | 716/101 |
| 5,828,678 A | 10/1998 | Mock | |
| 5,838,256 A | 11/1998 | Pearson et al. | |
| 5,952,933 A | 9/1999 | Issa et al. | |
| 5,961,577 A | 10/1999 | Soenen et al. | |
| 5,963,043 A | 10/1999 | Nassif | |
| 5,964,881 A | 10/1999 | Thor | |
| 5,970,142 A | 10/1999 | Erickson | |
| 6,002,991 A | 12/1999 | Conn | |
| 6,005,829 A | 12/1999 | Conn | |
| 6,101,624 A | 8/2000 | Cheng et al. | |
| 6,150,837 A | 11/2000 | Beal et al. | |

(Continued)

OTHER PUBLICATIONS

U.S. Appl. No. 13/082,271, filed Apr. 7, 2011, Trimberger.

(Continued)

*Primary Examiner* — Phallaka Kik
(74) *Attorney, Agent, or Firm* — Steven Slater; LeRoy D. Maunu; John J. King

(57) ABSTRACT

An embodiment of the invention relates to an integrated circuit such as an FPGA wherein a stable unique identifier is produced by reading an intrinsic characteristic of the IC such as a physically unclonable function, and a related method. In one embodiment, a first unique identifier is generated using the intrinsic characteristic and is subdivided into a plurality of first subsets. A second unique identifier is received and subdivided into a plurality of second subsets. The first and second subsets are compared to identify matching subsets to generate the stable unique identifier. Each of the one or more matching subsets includes a particular one of the plurality of first subsets that matches a corresponding one of the plurality of second subsets. The stable unique identifier can be integrated into logic of the IC. Prior to comparing the subsets, the first and second subsets can be transformed with one-way functions.

20 Claims, 6 Drawing Sheets

U.S. PATENT DOCUMENTS

| | | | |
|---|---|---|---|
| 6,161,213 A * | 12/2000 | Lofstrom | 324/750.15 |
| 6,185,126 B1 | 2/2001 | Rodgers et al. | |
| 6,215,874 B1 | 4/2001 | Borza et al. | |
| 6,230,270 B1 | 5/2001 | Laczko, Sr. | |
| 6,233,339 B1 | 5/2001 | Kawano et al. | |
| 6,260,146 B1 | 7/2001 | Mos et al. | |
| 6,298,453 B1 | 10/2001 | Culbertson et al. | |
| 6,351,814 B1 | 2/2002 | Batinic et al. | |
| 6,356,637 B1 | 3/2002 | Garnett | |
| 6,587,978 B1 | 7/2003 | Merritt et al. | |
| 6,604,214 B1 | 8/2003 | Fukushima | |
| 6,741,900 B2 * | 5/2004 | Tamura et al. | 700/97 |
| 6,791,353 B1 | 9/2004 | Beal et al. | |
| 6,816,825 B1 * | 11/2004 | Ashar et al. | 703/14 |
| 6,823,069 B1 | 11/2004 | Kitajima et al. | |
| 6,931,543 B1 | 8/2005 | Pang et al. | |
| 6,978,397 B2 | 12/2005 | Chan | |
| 7,191,339 B1 | 3/2007 | Trimberger | |
| 7,200,235 B1 | 4/2007 | Trimberger | |
| 7,240,218 B2 | 7/2007 | Kean | |
| 7,299,325 B1 * | 11/2007 | Waterhouse et al. | 711/159 |
| 7,380,131 B1 | 5/2008 | Trimberger | |
| 7,565,541 B1 | 7/2009 | Tarbouriech | |
| 7,734,643 B1 * | 6/2010 | Waterhouse et al. | 707/770 |
| 8,176,072 B2 * | 5/2012 | Jayakody et al. | 707/769 |
| 8,218,859 B2 * | 7/2012 | Wang et al. | 382/160 |
| 2001/0032318 A1 | 10/2001 | Yip et al. | |
| 2002/0018561 A1 | 2/2002 | Emelko | |
| 2008/0270805 A1 | 10/2008 | Kean | |
| 2009/0303044 A1 * | 12/2009 | Furuichi et al. | 340/568.1 |
| 2010/0044438 A1 * | 2/2010 | Chen et al. | 235/462.01 |
| 2012/0158790 A1 * | 6/2012 | Chowdhury | 707/797 |

OTHER PUBLICATIONS

U.S. Appl. No. 12/876,825, filed Sep. 7, 2010, Trimberger.
U.S. Appl. No. 11/101,076, filed Apr. 7, 2005, Trimberger.
U.S. Appl. No. 11/151,985, filed Jun. 14, 2005, Trimberger.
U.S. Appl. No. 12/961,770, filed Dec. 7, 2010, Trimberger.
U.S. Appl. No. 12/962,566, filed Dec. 7, 2010, Trimberger.
Ajluni, Cheryl, "Give Your IP a Unique ID With Silicon Fingerprinting," *Electronic Design*, Feb. 7, 2000, pp. 1-2, Penton Media, Inc., New York, New York, USA.
Eastlake, D. et al., *Randomness Recommendations for Security*, Dec. 1994, RFC 1750, downloaded Jan. 27, 2005 from www.faqs.org/rfcs/rfc1750.html, pp. 1-24.
IBM Corporation, *Integrated Circuit Compatible Random Number Generator*, IBM Technical Disclosure Bulletin, TBD-ACC-No. NN8804333, Apr. 1, 1998, vol. 1, Issue No. 11, pp. 333-335.
Intrinsic-ID, Inc., *Quiddikey*, downloaded Sep. 15, 2010 from www.intrinsic-id.com/products, Intrinsic-ID, Inc., San Jose, California, USA.
Suh, G. Edward et al., "Physical Unclonable Functions for Device Authentication and Secret Key Generation," *Proc. of the 44th ACM/IEEE Design Automation Conference*, Jun. 4, 2007, pp. 9-14, ACM, New York, New York, USA.
Xilinx, Inc., *The Programmable Logic Data Book 1998*, (v1.4), Chapter 4, Nov. 10, 1997, pp. 4-1 to 4-374, Xilinx, Inc., San Jose, California, USA.
Xilinx, Inc., *Using Look-Up Tables as Shift Registers (SRL16) in Spartan-3 Generation FPGAs*, XAPP465 (v1.1), May 20, 2005, pp. 1-17, Xilinx, Inc., San Jose, California, USA.

* cited by examiner

UNIQUE IDENTIFIER DERIVED FROM AN INTRINSIC CHARACTERISTIC OF AN INTEGRATED CIRCUIT

CROSS-REFERENCE TO RELATED APPLICATION

This application relates to the following co-pending and commonly assigned patent application: filed on the same day as the present application, having application Ser. No. 12/961,770, entitled "PROTECTING A DESIGN FOR AN INTEGRATED CIRCUIT USING A UNIQUE IDENTIFIER", which application is hereby incorporated herein by reference.

FIELD OF INVENTION

An embodiment of the invention relates generally to generating a stable unique identifier derived from an intrinsic characteristic of an integrated circuit, and more particularly to generating the stable unique identifier by using subdivision or error correction techniques.

BACKGROUND

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks (BRAM), multipliers, digital signal processing blocks ("DSPs"), processors, clock managers, delay lock loops ("DLLs"), and so forth. CLBs commonly comprise look-up tables (LUTs) to implement Boolean logic, registers and arithmetic logic. A LUT is a multiple-input memory representing a truth-table of the logic function to be performed. Therefore, a LUT can implement any function of its inputs. Further, it is easy to change the function of a LUT by simply changing the truth table it contains. The functionality of a LUT is limited by the number of its inputs. A common LUT size for an FPGA has four inputs, but other sizes have been built, including three inputs and six inputs.

Each programmable device typically includes both programmable interconnects and programmable logic. The programmable interconnects typically include a large number of interconnect lines of varying lengths interconnected by programmable interconnect points ("PIPs").

The programmable logic implements the logic of a user design using programmable elements that can include, for example, function generators, registers, arithmetic logic, and so forth.

The user design comprises logic functions, such as logic gates, registers, state machines, memories, microprocessors and input/output pins. In a compilation step, logic in the user design is mapped to the logic elements of the PLD LUTs. Wires in the user design are mapped to the programmable interconnects of the PLD to make electrical connections to the blocks where the user logic was mapped.

The programmable interconnect and programmable logic are typically programmed by loading a stream of configuration data into internal configuration memory cells that define how the programmable elements are configured. The configuration data can be read from memory (e.g., from an external programmable read-only memory ("PROM") or written into a FPGA by an external device. The collective states of the individual memory cells then determine the function of the FPGA.

Another type of PLD is the Complex Programmable Logic Device, ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic (PAL) devices. In CPLDs, configuration data is typically stored on-chip in non-volatile memory. In some CPLDs and FPGAs, configuration data is stored on-chip in non-volatile memory, then downloaded to volatile memory as part of an initial configuration (programming) sequence. In some CPLDs and FPGAs, non-volatile memory controls programmable interconnects and logic directly.

For all of these PLDs, the functionality of the device is controlled by data bits provided to the device for that purpose. The data bits can be stored in volatile memory (e.g., static memory cells), in non-volatile memory (e.g., FLASH memory), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or anti-fuse technology. The terms PLD and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Semiconductor integrated circuits such as processors, PLDs, and application specific integrated circuits ("ASICs") require a substantial amount of development resources for their design. Integrated circuits such as FPGAs are commonly used in high-volume applications such as for processing video signals, decoding audio signals, etc. An issue in the marketplace is the ease with which such devices can be reverse engineered and then reproduced with much less effort than that required for their original development. To protect the intellectual property inherent in such devices, researchers have described embedding a non-volatile chip identifier on the semiconductor device, and to insert into the user function a check for the proper chip identifier to protect the design against unauthorized reproduction.

An option to provide program protection for an integrated circuit such as a PLD, i.e., to provide a level of protection against unauthorized use, is to send an encrypted bitstream for the program from the nonvolatile external memory device to the PLD when it is powered up, and to provide a decrypter in the PLD with a decryption key that is stored in nonvolatile memory internally to the PLD. The program in the flash memory or other external source would be encrypted for the particular PLD chip. The internal nonvolatile memory could be formed using selectably clearable fuses, or by using a battery backed-up memory such as a RAM. Practical design issues associated with encrypting a program for a PLD are details related to how the decryption key is stored, how easily such a key can be broken or by-passed, and whether customers for the PLD can provide their own decryption key. Such protection processes have vulnerabilities that can be compromised by reverse engineering of the chip. For example, the logical signal that is recorded in the chip when a decryption key is produced or validated might be identified by reverse engineering and overwritten, thereby compromising the protection provided by the decryption key.

Another option to provide program protection for the integrated circuit or other digital device is to employ a device identifier to be used like a password. A design is customized for a particular integrated circuit by storing the device identifier of that integrated circuit with the design. That storage may be as an initial value in a memory or as a circuit that checks the device identifier value. Checking may be performed with a circuit or with software in the design. The device identifier may be stored in a nonvolatile memory on the chip.

A reproducible and unique chip identifier is needed. Accordingly, there is a need for a process and related method to employ a reproducible and unique identifier to protect the chip against unauthorized reproduction. The process should be simple, because it would be applied to every instance of the die, and the resulting device should be substantially immune to reverse engineering, thereby avoiding disadvantages of conventional approaches for protecting unauthorized chip reproduction.

SUMMARY

In accordance with an exemplary embodiment, a stable identifier for an integrated circuit ("IC") produced by employing an intrinsic characteristic of the IC and a related method are provided. In one embodiment, a first unique identifier is generated using the intrinsic characteristics of the IC, and the first unique identifier is subdivided into a plurality of first subsets. A second unique identifier is received and subdivided into a plurality of second subsets. The plurality of first subsets is then compared with the plurality of second subsets to identify one or more matching subsets to generate the stable unique identifier. Each of the one or more matching subsets includes a particular one of the plurality of first subsets that matches a corresponding one of the plurality of second subsets.

In this embodiment, a physically unclonable function can be employed to produce the first unique identifier. In this embodiment, a linear feedback shift register can be configured to shift the matching values to produce the stable unique identifier with an approximately equal number of 1s and 0s. In this embodiment, prior to comparing the plurality of first subsets with the plurality of second subsets, the plurality of first subsets can be transformed with a first one-way function, and the plurality of second subsets can be transformed with a second one-way function. In this embodiment, the stable unique identifier can be integrated into logic of the IC. In this embodiment, an authorization code for a design that is to be instantiated in the IC can be employed to produce the second unique identifier. In this embodiment, an EXCLUSIVE OR operation employing the stable unique identifier as an input can be performed on bus data of the IC before the bus data is transmitted. In this embodiment, the intrinsic characteristic of the IC can comprise a delay of signals propagating through wires and transistors of the IC.

In accordance with a further exemplary embodiment, an IC is produced including an intrinsic characteristic reader configured to read an intrinsic characteristic embedded in the IC to produce a first unique identifier for the IC. In one embodiment, a first subset generator in the IC is configured to divide the first unique identifier into a plurality of first subsets, and a receiver in the IC configured to receive a second unique identifier for the IC. A second subset generator in the IC is configured to divide the second unique identifier into a plurality of second subsets, and a comparator in the IC is configured to compare the plurality of first subsets with the plurality of second subsets to identify one or more matching subsets to generate a stable unique identifier. Each of the one or more matching subsets includes a particular one of the plurality of first subsets that matches a corresponding one of the plurality of second subsets.

In this embodiment, the first unique identifier can be a physically unclonable function. In this embodiment, a linear feedback shift register can be configured to shift the matching values to produce the stable unique identifier with an approximately equal number of 1s and 0s. In this embodiment, a first one-way function can be configured to transform the partitioned subsets, and a second one-way function configured to transform the corresponding subsets prior to the comparator identifying the one or more matching subsets. In this embodiment, the stable unique identifier can be EXCLUSIVE ORed with bus data of the IC before the bus data is transmitted.

In accordance with a further exemplary embodiment, a method is provided to generate a stable unique identifier for an IC derived from an intrinsic characteristic of the IC. In one embodiment, the method includes generating a first unique identifier using the intrinsic characteristics of the IC, and generating the stable unique identifier by one of: (1) employing an error correction code for the first unique identifier wherein the first unique identifier comprises a first physically unclonable function, or (2) employing subsets of the first unique identifier.

In this embodiment, the method including generating the stable unique identifier by employing an error correction code can be performed by generating an error correction code for the physically unclonable function, storing the error correction code external to the IC, generating a second physically unclonable function, and correcting the second physically unclonable function using the error correction code. In this embodiment, the second physically unclonable function can include an attempted regeneration of the first physically unclonable function. In this embodiment, the error correction code can be constructed with a functional Hamming distance of 16 bits. In this embodiment, the error correction code can be formed with a two-dimensional error correction code. In this embodiment, the two-dimensional error correction code can be formed with a two-dimensional representation of the first unique identifier, row check bits, column check bits, and check bits on check bits. In this embodiment, generating the stable unique identifier by employing the subsets of the first unique identifier can be performed by subdividing the first unique identifier into a plurality of first subsets, receiving a second unique identifier, subdividing the second unique identifier into a plurality of second subsets, and comparing the plurality of first subsets with the plurality of second subsets to identify one or more matching subsets. Each of the one or more matching subsets can include a particular one of the plurality of first subsets that matches a corresponding one of the plurality of second subsets.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, and may be described only once in the interest of brevity. For a more complete understanding of the invention, reference is now made to the following descriptions taken in conjunction with the accompanying drawings, in which:

DETAILED DESCRIPTION

Figure 1:
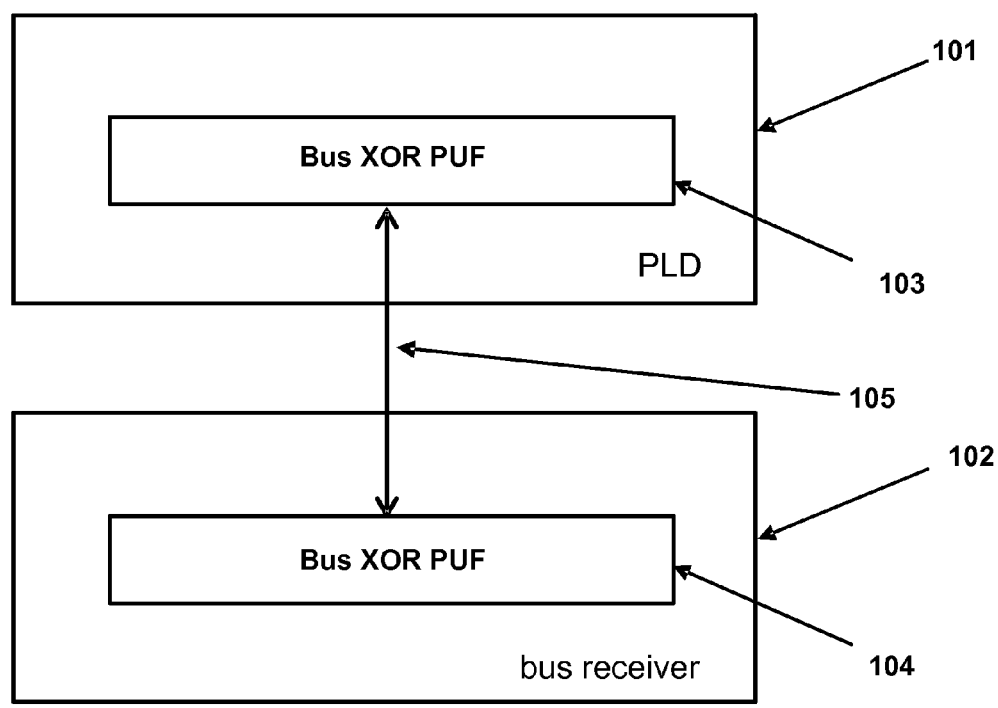
FIG. 1 illustrates a block diagram showing an integrated circuit such as, e.g., a PLD that includes a decryption key integrated into the design of the PLD, constructed according to an embodiment of the present invention.

The making and using of one or more embodiments of the present invention are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a process to provide reliable reproduction of a physically unclonable function.

An embodiment of the invention may be applied to an arrangement for protection or unauthorized reproduction or utilization of an integrated circuit, for example, to a programmable logic device that includes a configurable logic block. As an example, the integrated circuit can be an FPGA. Other arrangements and applications for protection of an integrated circuit against unauthorized chip reproduction or utilization can be constructed and applied using processes as introduced herein in different contexts using inventive concepts described herein, for example, to an application-specific integrated circuit ("ASIC") or to other signal processing or memory devices. Such a device will be referred to herein simply as a programmable logic device ("PLD").

A program for an integrated circuit such as a PLD is often stored in an external memory device, for example in an external flash device or other nonvolatile memory device that will be used to program the PLD. When such an integrated circuit is powered up, it is essentially an unprogrammed, general-purpose device, and a program, i.e. a configuration bitstream, is loaded into the integrated circuit from the external memory device to provide its functionality for a particular application. The program that is loaded into the integrated circuit establishes the logic functions performed by the integrated circuit, as well as the "wiring" that establishes how the logic functions are coupled to each other. The integrated circuit may include RAM ("random access memory") that holds the program that controls the logic functions. The external memory device may be an external server or, more commonly, an external flash memory that holds the program.

One issue, as described previously hereinabove, for production of integrated circuits such as PLDs and similar devices is that someone could steal the program, which is an embodiment of a substantial amount of intellectual property that was required for its design, representing a considerable capital investment. Although one or more embodiments described hereinbelow will refer to protection of intellectual property in a PLD, it is contemplated within the broad scope of the invention that such protection processes and methods can be applied, in general, to an integrated circuit.

The chip identifier may be implemented with a unique identifier such as, e.g., a physically unclonable function ("PUF"). Such a PUF would be unique in that a substantial number of degrees of freedom would be inherent in the creation of the PUF. It would be tamper resistant so that the output of the PUF would be sensitive to small changes in manufacture of the device. It would also be unforgeable so that copies of the device could not be practically produced.

A PUF is simply a long string of bits that may have some bits different every time it is interrogated. If a raw PUF is generated on a chip and compared with an expected value, the result may be incorrect even if the expected value was read from the same chip. A method of handling these small differences is required. One such method would be to count the differing bits and allowing some small number of differences. However, using reverse engineering, an adversary attempting to defeat the check would find it relatively simple to identify the generated error indicator and modify it to always report no error.

Many methods are known to generate a PUF. For example, a memory structure can be included on an integrated circuit that produces a random binary sequence that is different from chip to chip, but is essentially the same binary sequence for the particular chip each time it is powered up. It is expected that there will be a small variation in the binary sequence each time the particular chip is powered up, particularly as the chip ages, or as its temperature, voltage, or other environmental parameter varies. Thus, the contents of the memory structure on a particular chip will be mostly but not completely repeatable. Various techniques are well known in the art to employ oscillators or memory structures that generate a unique and mostly repeatable binary sequence each time the chip is powered up. For example, a memory structure dependent on chip-dependent threshold voltages of MOSFETs may be employed to generate a unique and mostly repeatable binary sequence. Oscillators can have frequencies that are slightly variable from chip to chip. The variation of delay of signals propagating through wires and transistors of the IC may be employed to generate a chip-unique binary sequence. Such a binary sequence, which is often 256 bits long or longer, provides a "fingerprint" for a particular chip is very difficult to clone, even by an authorized device manufacturer. Since some PUF bits may differ due to temperature, voltage, aging or other effects, the PLD must check for a near-match rather than an exact match. For example, a passing identifier may match only 200 of the 256 bits.

To avoid the vulnerability issue of simply setting a logical signal on the chip after a decryption key is produced or validated, which leads to reverse-engineering vulnerabilities, a decryption key or device identifier, as introduced herein, is integrated into the PLD design, such as directly integrating the PUF into the PLD design that comprises computation or logic. A PLD computation or logic may be customized to match only a specific device by adding logic to the computation or logic to EXCLUSIVE OR a data bus of the design with the device identifier and also inverting the bits of the data bus that correspond to "1" bits in the device identifier of the PLD to which the computation is targeted. If the chip identifier of the PLD does not match the identifier for which the design was customized, the bus data will be corrupted. The design only functions correctly if is loaded into the proper device.

Turning now to FIG. 1, illustrated is a block diagram showing an integrated circuit such as, e.g., a PLD 101 that includes a decryption key or device identifier integrated into the PLD design, constructed according to an embodiment of the present invention. The PLD 101 transmits data over a bus 105 to a bus receiver 102 that may be on the same or another device. The PLD 101 includes a bus EXCLUSIVE OR 103 that logically EXCLUSIVE ORs bus data with a key prior to transmission over the bus 105 to the bus receiver 104. An EXCLUSIVE OR operation will be referred to herein in drawings as an "XOR" operation to simplify the appearance of the drawings. The bus receiver 104 includes a bus EXCLUSIVE OR 104 that also logically EXCLUSIVE ORs bus data with the key after reception. The EXCLUSIVE OR operation flips bus bits that correspond to "1" bits in the key. Flipping bits both in the EXCLUSIVE OR bus transmission operation and the EXCLUSIVE OR bus reception operation restores the bus data to its original value. The process of operating on bus data substantially increases the complexity of reverse engineering.

Figure 2:
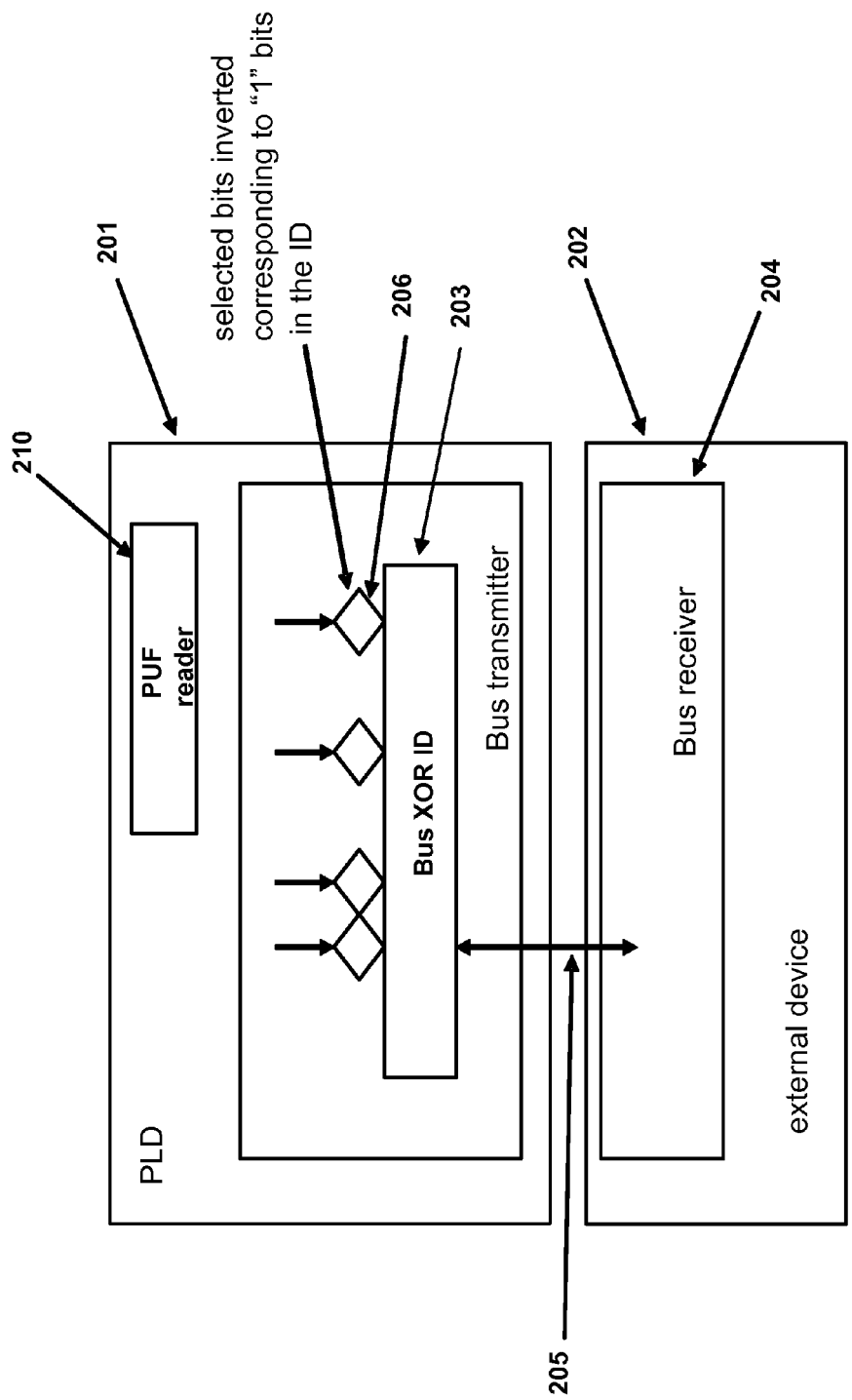
FIG. 2 illustrates a block diagram showing an integrated circuit such as, e.g., a PLD to integrate a decryption key into the design of the PLD, constructed according to an embodiment of the present invention.

Turning now to FIG. 2, illustrated is a block diagram showing an integrated circuit such as, e.g., PLD 201 to integrate a decryption key into the PLD design, constructed according to an embodiment of the present invention. The PLD 201 includes an intrinsic characteristic reader such as, e.g., a PUF function reader 210. The PLD 201 includes a transmitter such as, e.g., bus transmitter 203 that transmits data over a bus 205 to an external device that includes a receiver such as, e.g., bus receiver 204. In a design customization process, data stored in the PLD 201 prior to transmission over the bus 205 has selected bits inverted corresponding to the "1" bits of a decryption key or device identifier associated with the particular PLD 201. Prior to transmitting the data over the bus 205, all bits of the bus are EXCLUSIVE ORed with the device identifier. If the device identifier of the PLD matches the design customization, then the signals on the data bus will be restored and the design will function correctly. If the device identifier does not match, as would be the case if the design is loaded into a different PLD than the one for which it was customized, the data bus values will be corrupted and the design will not function correctly. The process of operating on bus data substantially increases the complexity of reverse engineering. Of course, other logical arrangements to transmit data over a bus modified by a decryption key can be constructed within the broad scope of the invention. The EXCLUSIVE OR operation may be applied before or after the inversion. The bus may in fact be several signals that may not be related. Operations other than inversion and EXCLUSIVE OR may be applied for customization and checking.

A chip identifier used as a password or decryption key should be reproducible for the particular chip to provide reliable program decryption or enablement, or for decryption of a data stream transmitted to or processed within the integrated circuit during normal device operation. In one embodiment, the identifier is unvarying and stable (e.g., reproducible) over the life of the chip to enable repeatable execution of the decryption or enablement process. A technique to produce a device identifier for an integrated circuit such as a programmable logic device employs check bits in an error correcting code, as described by S. M. Trimberger in U.S. Pat. No. 7,191,339, entitled "System and Method for Using a PLD Identification Code," issued Mar. 13, 2007 ("Trimberger") which is hereby incorporated herein by reference. As described therein by Trimberger, an inaccurate identifier value may be corrected by an error correction process such as an error correction code to accurately reproduce the chip identifier.

The program contained in the external memory device would also ordinarily be protected by an encryption process.

Recall that a PUF is a string of bits that may have some bits altered each time it is generated. If a raw PUF is EXCLUSIVE ORed with a data stream using internal logic, the result will likely be incorrect. A unique identifier that can be constructed from the PUF is needed for reliable execution of a decoding operation. Thus, what is needed is a process to convert a raw PUF with its changed bits into a stable identifier that can be used to gate logic during chip operation. The process should be simple, because it will be applied to a large number of die with stringent cost and performance metrics.

An embodiment introduced herein of a process to protect a specific chip such as a PLD from unauthorized reproduction restricts a program or design to operate only on the specific chip. By utilizing the process, encryption of the program is advantageously not required. An identifier is incorporated into the chip, and the program and its operation are constructed to rely on a stable identifier associated with the chip. The chip generates the identifier and utilizes the identifier to decode, for example, a processor data bus. Data supplied to the chip may be encoded utilizing the identifier, which the chip would then decode utilizing the identifier. The identifier may thus be more widely integrated into chip logic than a simple test to make reverse engineering of the PUF more difficult.

In the process, a comparison is employed to identify subsets of a raw PUF that match the original PUF. If an insufficient number of the subsets match, the PUF match fails and the chip is inoperable. If enough subsets match, the PUF comparison succeeds and the matched subsets are used to create a unique identifier, for example, for the present session of a PLD.

Figure 3:
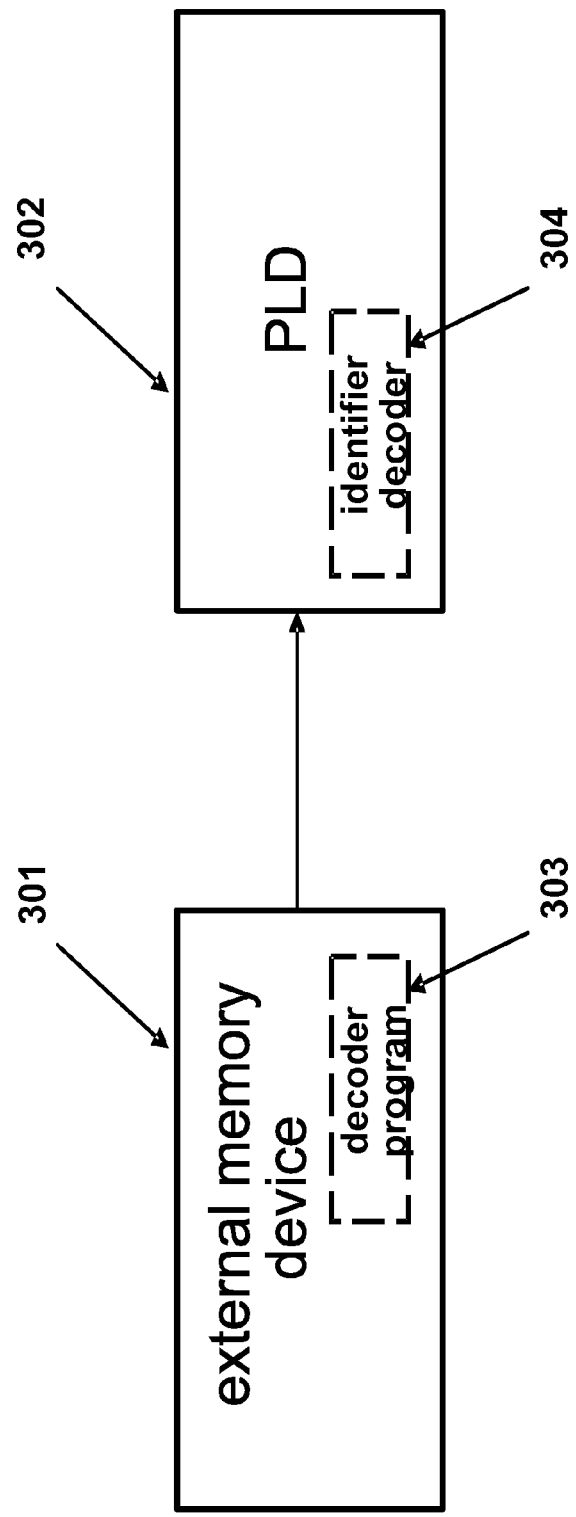
FIG. 3 illustrates a drawing of an external memory device coupled to a PLD, constructed according to an embodiment of the present invention.

Referring now to FIG. 3, illustrated is a drawing of an external memory device 301 coupled to a PLD 302, constructed according to an embodiment of the present invention. The external memory device 301 contains a decoder program 303. The decoder program 303 is transmitted to the PLD 302, which is then stored in the PLD 302 to form an identifier decoder 304. The identifier code may be used by the PLD to enforce a program to operate only on the specific chip.

Figure 4:
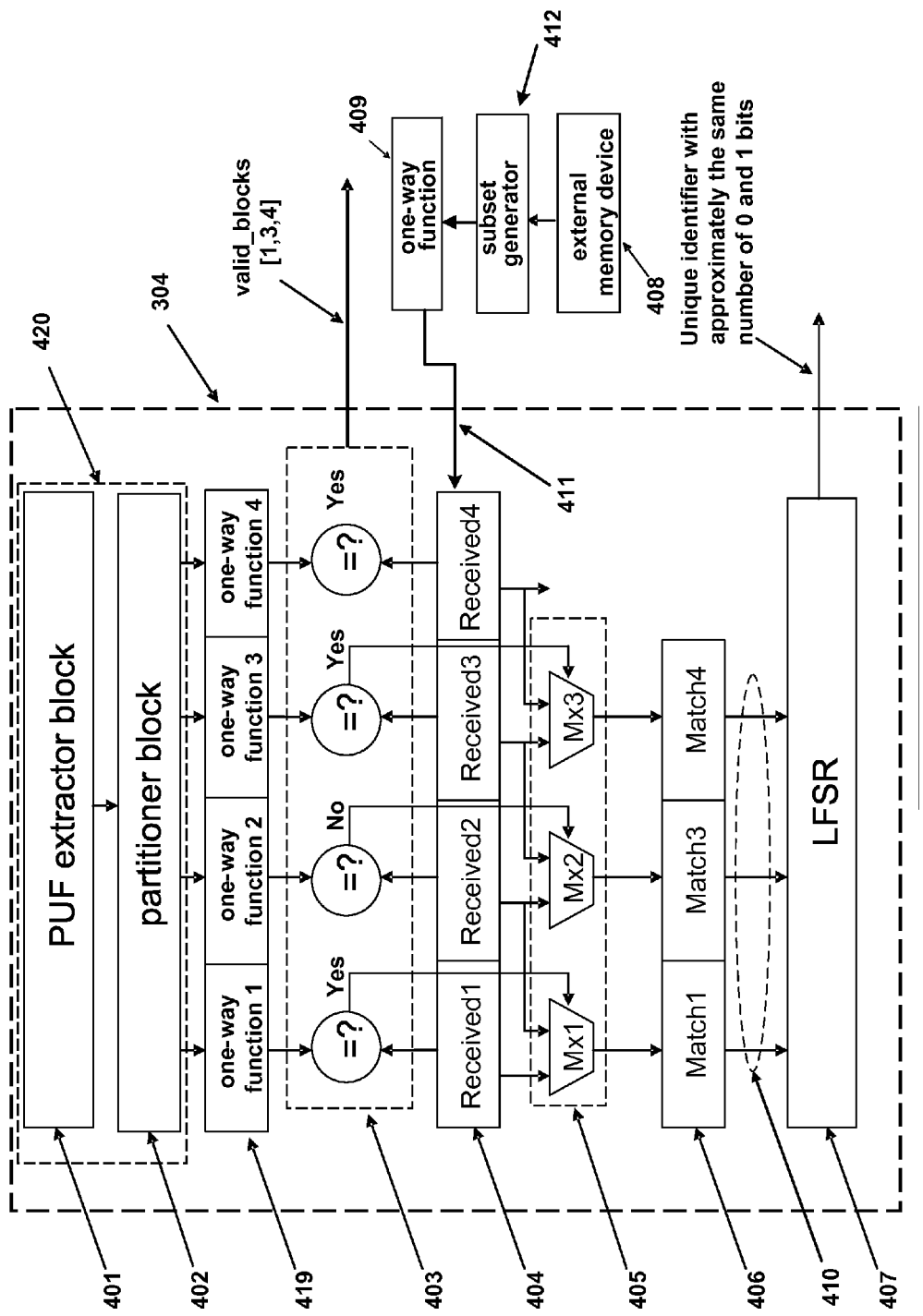
FIG. 4 illustrates a drawing of an identifier decoder operable in a PLD to produce a stable, chip-unique identifier from a raw PUF, constructed according to an embodiment of the present invention.

Referring now to FIG. 4, illustrated is a drawing of a process showing a chip identifier decoder 304 operable in a PLD to produce a stable, chip-unique identifier from a raw PUF, constructed according to an embodiment of the present invention. The identifier decoder 304 includes an intrinsic characteristic reader such as, e.g., a physically unclonable function reader 420. In PUF extractor block 401 the raw PUF with some possibly altered bits is generated by a physical process unique to the chip. In an embodiment, the raw PUF contains 256 bits. In partitioner block 402, the raw PUF is partitioned into subsets SS1, SS2, . . . , SSn, where n=4 in the present example. A sufficient number of matching PUF subsets can be ensured by partitioning the PUF into enough subsets. In the limit, the subsets are one bit each. More subsets results in fewer total PUF bits per subset, but more subsets require a larger number of multiplexers to select matching subsets. An exemplary number of bits for each subset is eight bits, which is a number of consecutive bits that is presently likely to be accurately reproduced from a raw PUF most of the time. As an example for a 256-bit PUF, the PUF may be partitioned into 32 subsets of eight bits each.

Block 404 contains subsets of the identifier produced by subset generator 412 employing an identifier received from the external memory device 408 such as the external flash memory. In comparator 403, each of the subsets in block 404 that contains the subsets from an authorized value 411 of the identifier received from the external memory device 408 is checked in a subset-wide EXCLUSIVE OR comparison against the corresponding raw PUF subset data. Blocks 409 and 419 are optional blocks that are described later hereinbelow.

In the example illustrated in FIG. 4, subset 2, i.e., "SS2," does not match identifier subset data in Received2. Therefore, SS2 cannot be used to construct the unique identifier. Accordingly, a match field is constructed to indicate that subsets 1, 3, and 4 match, as indicated by the notation "valid_blocks [1, 3, 4]" in FIG. 4 to produce a stable identifier 410. In an embodiment, valid_blocks is a bit pattern identifying the valid subsets. In the present example wherein the PUF is divided into four subsets, the valid_blocks bit pattern would be "1011" to indicate to the PLD that the second subset did not match. Thus, a longer raw PUF is employed than is actually used.

Rather than transmit to the PLD the actual PUF subsets (e.g., "Received1" in block 404), a one-way function of the PUF subsets, as illustrated by block 419, can optionally be sent and checked in the PLD against the same one-way function of the extracted PUF, as illustrated by block 409. A one-way function is a function that is easy to compute, but very difficult or otherwise impractical or impossible to invert. Someone monitoring the connection cannot practically extract the actual PUF or the resulting identifier.

As a further enhancement for chip security, it is generally desirable to have approximately an equal number of "0" and "1" bits in a chip identifier. A value of an identifier with a large number of zeros and only a few ones, or vice versa, can be readily broken by an attacker by trying a relatively modest number of code combinations. To ensure approximately equal numbers of "0" and "1" bits, the value of the identifier can be cycled in a linear feedback shift register ("LFSR"), e.g., for a fixed number of cycles such as 1000 cycles. The linear feedback shift register is an optional element in the function reader 210 to provide enhanced protection. The design of a linear feedback shift register such as a maximum length linear feedback shift register based on a primitive polynomial is well known in the art and will not be further described herein in the interest of brevity. Another method for ensuring approximately equal numbers of "0" and "1" bits is to run the device ID through an encryptor. Other methods may also be used.

The match blocks or the output of the LFSR 407 (which is preferably independently applied to each subset match block) is used as the identifier. The valid_blocks indicator (from the "=" blocks 403 to the multiplexer 405) select the inputs that are used to select which subsets of the PUF, i.e., the Match1, Match3, and Match4 inputs at validated PUF block 406, to use in the continuous comparison for validity (e.g., to indicate which bits of the raw PUF that can be pre-inverted to correct for unmatched bits).

The device identifier may be integrated into the operation of the PLD by sequentially EXCLUSIVE ORing the bits of the identifier with bits of a bus such as an internal bus. Each successive bit of the bus is EXCLUSIVE ORed with a successive bit resulting from a match block. For example, the bits of a match block that are supposed to be '1' cause the bits of the bus to be inverted so that the bus carries the correct value. In an embodiment, a look-up table configuration string of subset size times the number of bits per a look-up table entry can be built for each subset. The string is written to the look-up tables for the bus (or shifted in as part of a shift register look-up table) after the matching is done when the PLD is started up. Strings corresponding to non-matching subsets are skipped.

Integration of a device identifier into the operation of a PLD is distinguished herein from one or a plurality of simple "go-no go" checks that can be used to enable a function to operate based on an admissible value of the identifier. Integration of the device identifier into the operation of the PLD indicates that the device identifier is integrated into the logic of the PLD, such as by having the value of the device identifier or a function of that value affect signals within the PLD or the logical operation of gates within the PLD. Such integration of the device identifier would require that the detailed low-level logic of the PLD be examined, understood, and altered by an unauthorized user, which would generally require an impractical effort.

The external memory device 408 thus stores the entire PUF, and the validity check in the identifier decoder relies on the valid_blocks match field to identify selected subsets of the raw PUF for its validity determination. Encoding of signals in the PLD advantageously relies on the subsets of the raw identifier whose validity was ascertained, and the process to perform this selective action is contained in the PLD software and is executed in the PLD. The external memory device only needs to contain the algorithm that the PLD will use for the selective decoding of the raw identifier, and that algorithm is included in the design stored in the external memory device. It is not necessary for the PLD to transmit the valid_blocks match field to the external memory device. Accordingly, the external memory device does not need to know the result of the valid_blocks match field.

Choice of the subset size can make the implementation more efficient. If 16-bit subsets are used, SRL16s can be used to simplify the multiplexing operation. An "SRL16" is a 16-bit shift register look-up table, which generally may be of a static length or may be dynamically adjusted. If 32-bit subsets are used, SRL32s can be correspondingly used. SRL16 and SRL32 are common configuration modes of the logic cell of PLDs made by Xilinx, Inc., and described in Xilinx Application Note XAPP465 "Using Look-Up Tables as Shift Registers (SRL16) in Spartan-3 Generation FPGAs," which is hereby incorporated herein by reference.

By this process, the external memory device essentially enables protection of a PLD against unauthorized device utilization by enforcing a program to operate only on a specific chip. Encryption of the program is not required. An internal assessment is executed by the PLD to determine its proper identification, establishing thereby that the PLD and the external memory device are an allowed pair, and that data from the external memory device are destined for that PLD.

Another embodiment of a process to correct incorrect PUF bits employs an error correction code for the raw PUF data. The corrected PUF bits can then be integrated into the PLD design as described previously hereinabove to make reverse engineering difficult. PUF bits integrated into a PLD design are quite difficult to untangle from the chip logic.

After PLD manufacture, the PUF value is read from the chip and an error correction code is produced for the raw PUF value. The error correction code is stored external to the chip, such as in an external memory device 408. The process of reading the raw PUF value and generating the error correction code advantageously need only be performed once.

During normal PLD usage, such as when the PLD is powered up, the PLD program, i.e., the PLD configuration bitstream, is loaded into the PLD from the external memory device to provide the PLD functionality for the particular application. The raw PUF value is read. The error correction code for the PUF is transmitted by the external memory device to the PLD, which uses the error correction code to correct the PUF on chip, i.e., on the PLD. The corrected PUF is then used by the PLD in its computation on the chip. The corrected PUF bits can thus be integrated into the PLD design to make reverse engineering difficult.

Figure 5:
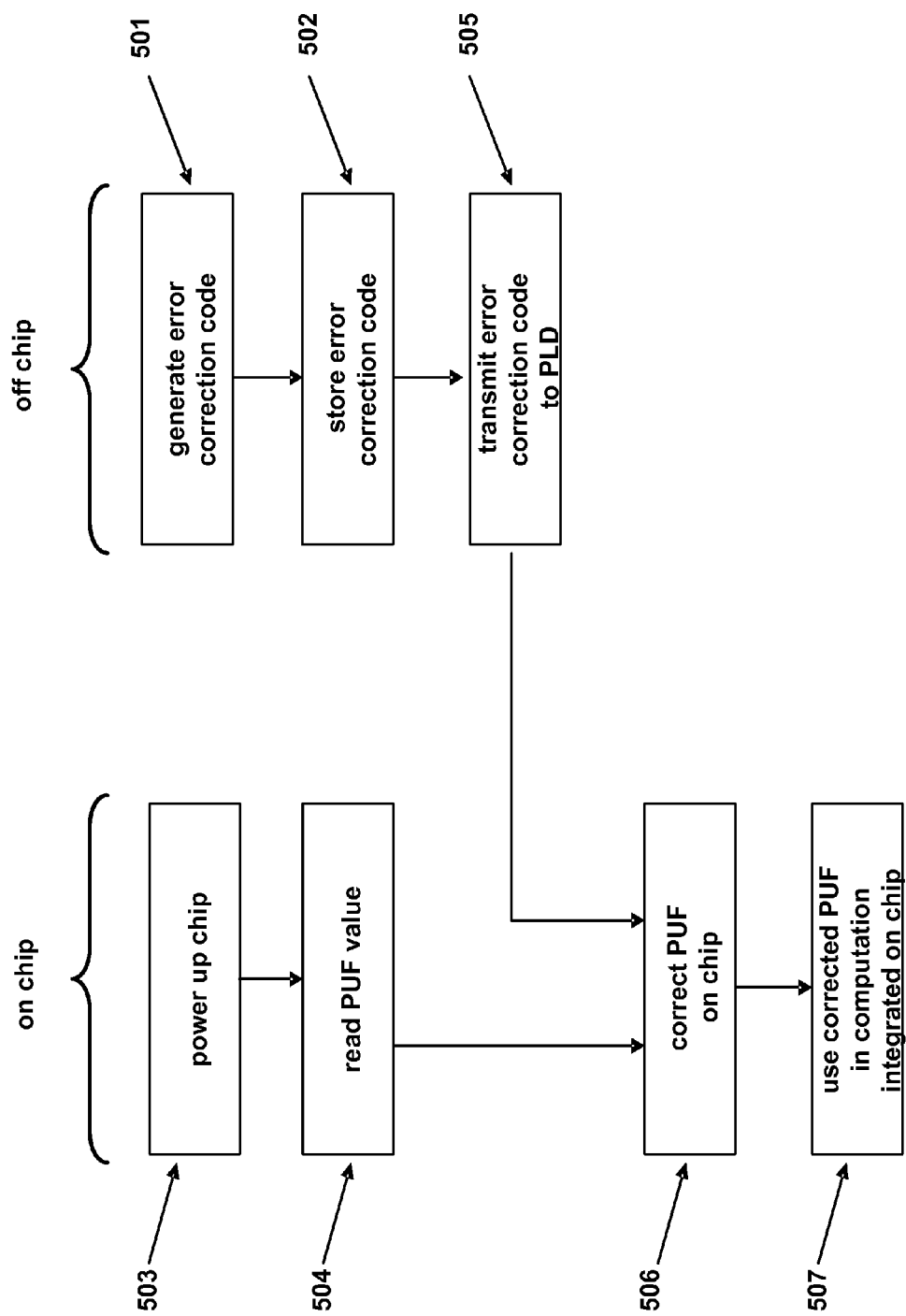
FIG. 5 illustrates a flowchart of a process to use an error correction code to correct a PUF on chip, constructed according to an embodiment of the present invention.

Turning now to FIG. 5, illustrated is a flowchart of a process to use an error correction code to correct a PUF on chip, constructed according to an embodiment of the present invention. In block 501, an error correction code is generated off chip in view of the expected number of bits produced by the PUF. In block 502, the error correction code is stored off chip. In block 503, the chip, such as a PLD, is powered up. In block 504, the PUF value is read on chip. In block 505, the error correction code is transmitted to the PLD. In block 506, the error correction code is employed to correct the PUF on chip. And in block 507, the corrected PUF is integrated into computation on the chip.

Various error correction codes, which can be designed to correct multiple bit errors, may be employed to correct the raw PUF data. An error correction code with a functional Hamming distance of N can correct $\lfloor(N-1)/2\rfloor$ bits, where the notation $\lfloor x \rfloor$ represents the value "x" rounded down to an integer. Hamming distance refers to the number of bits that differ between two binary words of the same bit length. The Hamming distance of the two binary words may be computed by performing an EXCLUSIVE OR operation on the two binary words, and counting the number of "1" bits in the result. A functional Hamming distance refers to the Hamming distance between one instance of an error correction code word and another instance. If N is even, then an additional error bit can be detected but not corrected.

Figure 6:
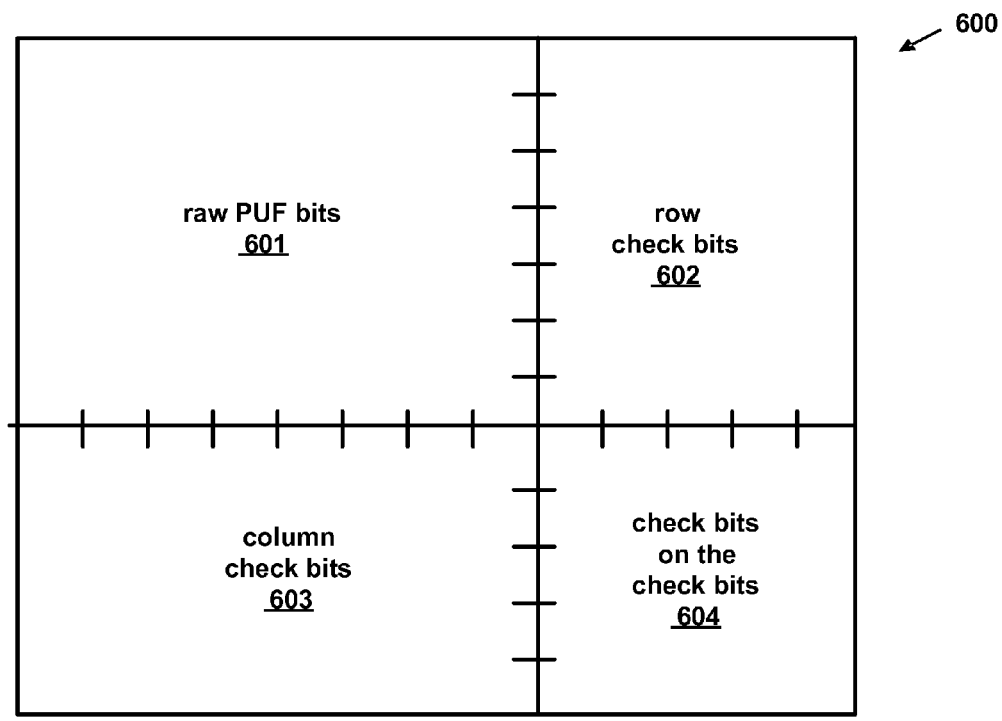
FIG. 6 illustrates a generic, two-dimensional representation of an error correction code including raw PUF bits, row check bits, column check bits, and check bits on check bits, constructed according to an embodiment of the present invention.

Turning now to FIG. 6, illustrated is a generic, two-dimensional representation 600 of an error correction code including raw PUF bits 601, row check bits 602, column check bits 603, and check bits on check bits 604, constructed according to an embodiment of the present invention. The functional Hamming distance of an error code is the product of the functional Hamming distance of the row code times the functional Hamming distance of the column code. For example, assume that a raw PUF in accordance with present invention has 56 bits. The raw PUF can be arranged in an array of bits having seven rows and eight columns. If the check bits on rows 602 provide a functional Hamming distance of 4 and the check bits on columns 603 provide a functional Hamming distance of 3, then the overall error correction code provides a functional Hamming distance of 12. The number of bits would generally be set on a per-PLD design basis.

In this example, for each 8-bit raw PUF word in a row, five check bits can be added to provide a functional Hamming distance of 4. Thus, five bits are added to each row and column of raw PUF 601 (indicated by row check bits 602 and column check bits 603). The error correction calculation is performed on check bits 602/603, wherein the check bits on the check bits 604 enable errors in the check bits 602/603 to be corrected. The resulting transferred code in this example has (8+5) times (7+5)=156 bits, with a functional Hamming distance of 4 times 4=16. Thus, up to $\lfloor(16-1)/2\rfloor=7$ bit errors can be corrected, and eight bit errors can be detected. Note that more errant bits can be corrected by adding additional check bits, i.e., either providing a greater functional Hamming distance on each row/column, or going to a three-dimensional array, which are processes well known to those skilled in the art.

Processes introduced herein may be formed as a computer program product including a computer usable medium, wherein the computer usable medium has a plurality of computer readable program codes embodied therein to perform the functions described herein of the computer program product.

Although processes for producing a chip identifier and related methods have been described for applications to integrated circuits such as PLDs including a configurable logic block, it should be understood that other applications of these processes such as for ASICs in general and other digital programmable devices are contemplated within the broad scope of the invention, and need not be limited to integrated circuit applications such as a PLD including a configurable logic block employing processes introduced herein. As described, a process may be implemented as steps in a computer or other sequential processing device, as a circuit in an integrated circuit such as a PLD, or as other means in an integrated circuit.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A method to generate a stable unique identifier derived from an intrinsic characteristic of an integrated circuit ("IC"), comprising:
    generating a first unique identifier using the intrinsic characteristics of the IC;
    subdividing the first unique identifier into a plurality of first subsets;
    receiving a second unique identifier;
    subdividing the second unique identifier into a plurality of second subsets; and
    comparing, using the integrated circuit, the plurality of first subsets with the plurality of second subsets to identify one or more matching subsets to generate the stable unique identifier, wherein each of the one or more matching subsets includes a particular one of the plurality of first subsets that matches a corresponding one of the plurality of second subsets.

2. The method of claim 1, wherein the first unique identifier comprises a physically unclonable function.

3. The method of claim 1, wherein the intrinsic characteristic of the IC comprises a delay of signals propagating through wires and transistors of the IC.

4. The method of claim 1, further comprising shifting the one or more matching values in a linear feedback shift register to produce the stable unique identifier with an approximately equal number of 1s and 0s.

5. The method of claim 1, further comprising transforming the plurality of first subsets with a first one-way function, and transforming the plurality of second subsets with a second one-way function prior to the comparing of the plurality of first subsets with the plurality of second subsets.

6. The method of claim 1, further comprising integrating the stable unique identifier into logic of the IC.

7. The method of claim 1, wherein the second unique identifier comprises an authorization code for a design that is to be instantiated in the IC.

8. The method of claim 1, wherein the stable unique identifier is EXCLUSIVE ORed with bus data of the IC before the bus data is transmitted.

9. An integrated circuit ("IC"), comprising:
- an intrinsic characteristic reader configured to read an intrinsic characteristic embedded in the IC to produce a first unique identifier for the IC;
- a first subset generator configured to divide the first unique identifier into a plurality of first subsets;
- a receiver configured to receive a second unique identifier for the IC;
- a second subset generator configured to divide the second unique identifier into a plurality of second subsets; and
- a comparator configured to compare the plurality of first subsets with the plurality of second subsets to identify one or more matching subsets to generate a stable unique identifier, wherein each of the one or more matching subsets includes a particular one of the plurality of first subsets that matches a corresponding one of the plurality of second subsets.

10. The integrated circuit of claim 9, wherein the first unique identifier comprises a physically unclonable function.

11. The integrated circuit of claim 9, further comprising a linear feedback shift register configured to shift the matching values to produce the stable unique identifier with an approximately equal number of 1s and 0s.

12. The integrated circuit of claim 9, further comprising a first one-way function configured to transform the first subsets, and a second one-way function configured to transform the second subsets prior to the comparator identifying the one or more matching subsets.

13. The integrated circuit of claim 9, wherein the stable unique identifier is EXCLUSIVE ORed with bus data of the IC before the bus data is transmitted.

14. A method to generate a stable unique identifier for an integrated circuit ("IC") derived from an intrinsic characteristic of the integrated circuit, comprising:
- generating a first unique identifier using the intrinsic characteristics of the IC; and
- generating, using the integrated circuit, the stable unique identifier by one of: (1) employing an error correction code for the first unique identifier wherein the first unique identifier comprises a first physically unclonable function, or (2) employing subsets of the first unique identifier.

15. The method of claim 14 wherein generating the stable unique identifier by employing an error correction code comprises:
- generating an error correction code for the physically unclonable function;
- storing the error correction code external to the IC;
- generating a second physically unclonable function; and
- correcting the second physically unclonable function using the error correction code.

16. The method of claim 15 wherein the second physically unclonable function comprises an attempted regeneration of the first physically unclonable function.

17. The method of claim 14 wherein the error correction code has a functional Hamming distance of 16 bits.

18. The method of claim 14 wherein the error correction code comprises a two-dimensional error correction code.

19. The method of claim 18 wherein the two-dimensional error correction code comprises a two-dimensional representation of the first unique identifier, row check bits, column check bits, and check bits on check bits.

20. The method of claim 14 wherein generating the stable unique identifier by employing the subsets of the first unique identifier comprises:
- subdividing the first unique identifier into a plurality of first subsets;
- receiving a second unique identifier;
- subdividing the second unique identifier into a plurality of second subsets; and
- comparing the plurality of first subsets with the plurality of second subsets to identify one or more matching subsets, wherein each of the one or more matching subsets includes a particular one of the plurality of first subsets that matches a corresponding one of the plurality of second subsets.

* * * * *